(12) United States Patent
Kawasaki

(10) Patent No.: US 12,265,745 B2
(45) Date of Patent: Apr. 1, 2025

(54) NON-TRANSITORY COMPUTER-READABLE STORAGE MEDIUM, CONTROL METHOD, AND INFORMATION PROCESSING APPARATUS FOR DISPLAYING INFORMATION RELATED TO A FUNCTION

(71) Applicant: CANON KABUSHIKI KAISHA, Tokyo (JP)

(72) Inventor: Keiji Kawasaki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/184,272

(22) Filed: Mar. 15, 2023

(65) Prior Publication Data
US 2023/0214162 A1 Jul. 6, 2023

Related U.S. Application Data

(63) Continuation of application No. 17/119,525, filed on Dec. 11, 2020, now Pat. No. 11,635,927.

(30) Foreign Application Priority Data

Dec. 27, 2019 (JP) .................................. 2019-239038

(51) Int. Cl.
*G06F 3/12* (2006.01)

(52) U.S. Cl.
CPC .......... *G06F 3/1275* (2013.01); *G06F 3/1204* (2013.01); *G06F 3/1205* (2013.01);
(Continued)

(58) Field of Classification Search
CPC .... G06F 3/1293; G06F 3/1225; G06F 3/1228; G06F 3/1254; G06F 3/1287; G06F 9/4411
(Continued)

(56) References Cited

U.S. PATENT DOCUMENTS

| 2009/0190150 A1* | 7/2009 | Selvaraj ................ G06F 3/1288 |
| | | 358/1.15 |
| 2014/0049790 A1* | 2/2014 | Nakamura ......... H04N 1/00464 |
| | | 358/1.13 |

(Continued)

FOREIGN PATENT DOCUMENTS

| CN | 102999304 A | 3/2013 |
| CN | 104636090 A | 5/2015 |

(Continued)

*Primary Examiner* — Jamares Q Washington
(74) *Attorney, Agent, or Firm* — Canon U.S.A., Inc. IP Division

(57) ABSTRACT

A control method of an information processing apparatus on which an expansion application configured to expand a function of print data generation software configured to generate print data runs, is provided. The control method comprises obtaining attribute data on a printing apparatus, the attribute data being output from the printing apparatus, obtaining data indicating a print function, and adding information related to a specific function based on attribute information included in the obtained attribute data if information indicating the specific function is not included in the obtained data indicating the print function. A setting screen including a setting item of the specific function is displayed based on the added information related to the specific function.

44 Claims, 14 Drawing Sheets

(52) U.S. Cl.
CPC .......... *G06F 3/1225* (2013.01); *G06F 3/1253* (2013.01); *G06F 3/1287* (2013.01)

(58) Field of Classification Search
USPC .................. 358/3.24, 1.9, 1.6; 717/110, 168
See application file for complete search history.

(56) References Cited

U.S. PATENT DOCUMENTS

| | | |
|---|---|---|
| 2016/0077770 A1 | 3/2016 | Morita |
| 2020/0249881 A1* | 8/2020 | Hosomizo ............. G06F 3/1253 |

FOREIGN PATENT DOCUMENTS

| | | | |
|---|---|---|---|
| CN | 110275683 A | | 9/2019 |
| JP | 2016058041 A | | 4/2016 |
| JP | 2016118893 A | * | 6/2016 |
| JP | 2017024272 A | | 2/2017 |
| JP | 2018156636 A | | 10/2018 |
| JP | 2018185779 A | | 11/2018 |
| JP | 2019067455 A | | 4/2019 |
| JP | 2019175330 A | | 10/2019 |
| JP | 2020126364 A | | 8/2020 |

* cited by examiner

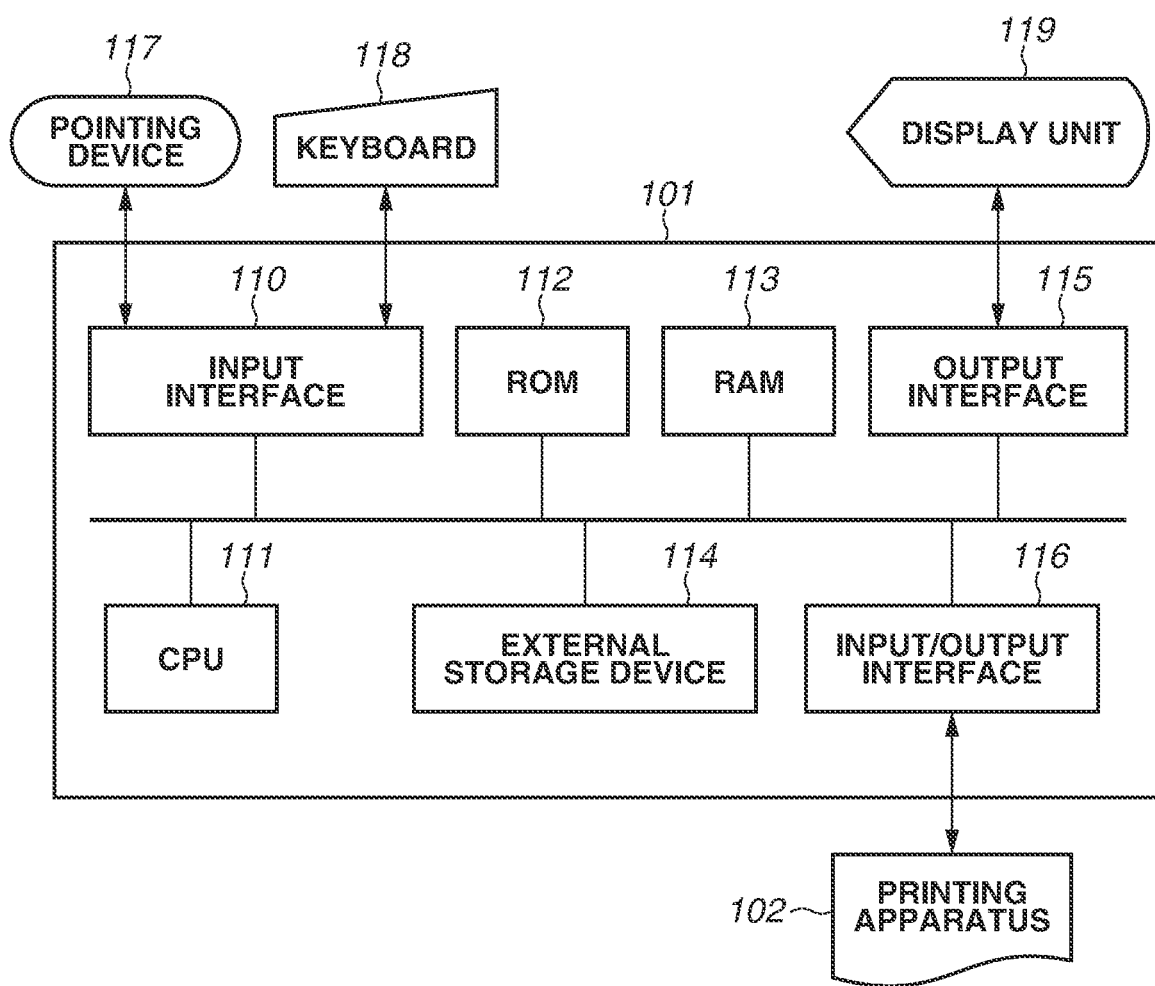

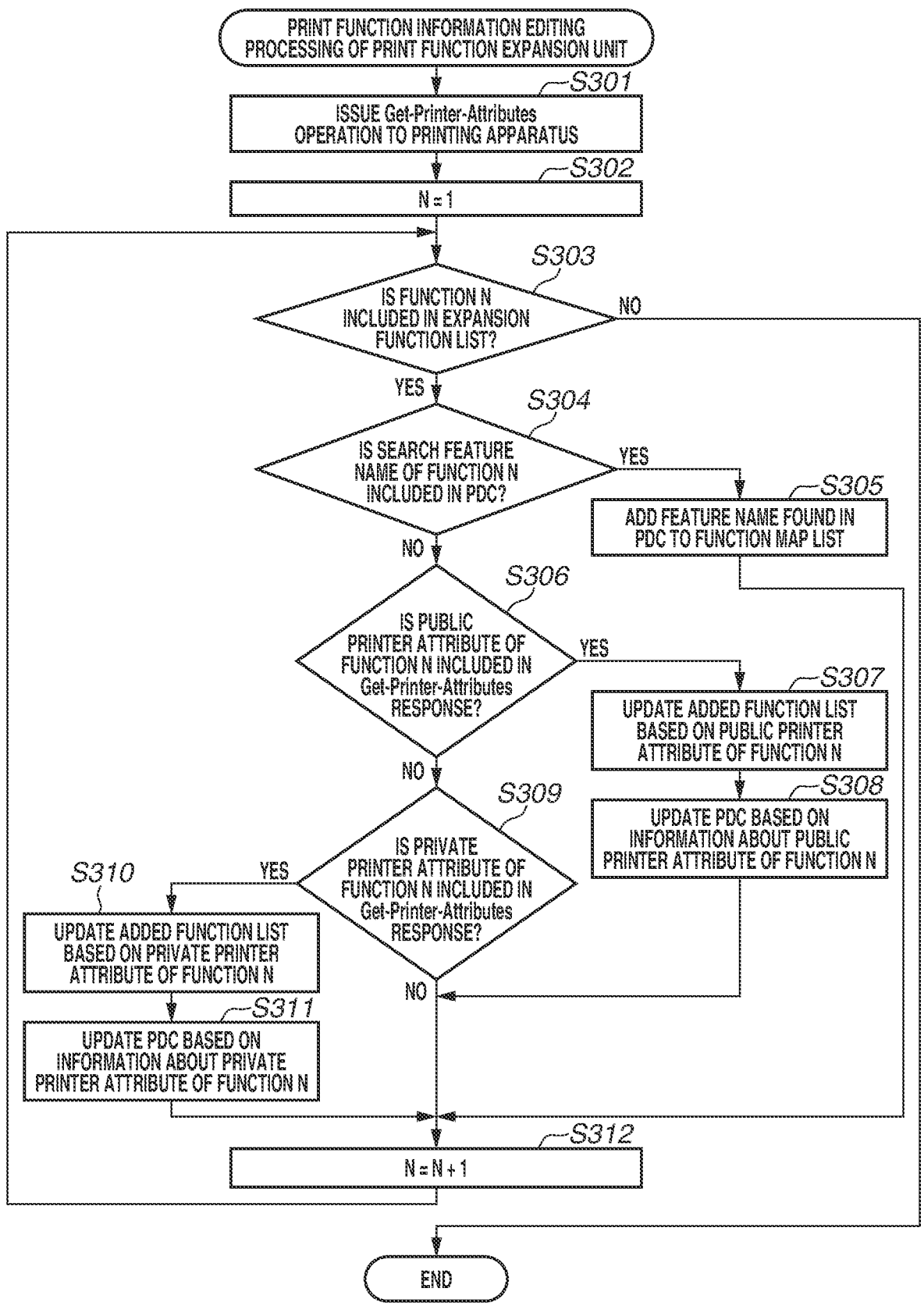

```
Get-Printer-Attributes:
    attributes-charset (charset) = utf-8
    attributes-natural-language (naturalLanguage) = en
        :                                                      402
    media-supported (1setOf keyword) = ... ,na_letter_8.5x11in, ...
        :
    media-top-margin-supported (1setOf integer) = 500,0,800,600  ~403
    media-left-margin-supported (1setOf integer) = 340,0,640,560,600
    media-right-margin-supported (1setOf integer) = 340,0,630,560,600
    media-bottom-margin-supported (1setOf integer) = 500,0,1270,600
        :
    cij-print-borderless-expandlevel (1setOf enum) = level0,level1,level2
        :                                                              404
```

```
Validate-Job:
    attributes-charset (charset) = utf-8
    attributes-natural-language (naturalLanguage) = en
        :
    job-attributes-tag ~1402
        media (keyword) = iso a4 210x297mm
        :
    cij-print-borderless-expandlevel (1setOf enum) = level1 ~1403
        :
```

FIG.5

| Expansion function | Search feature name | Feature name | Public printer attribute | Private printer attribute |
|---|---|---|---|---|
| Function 1 | *BorderlessEx* | PageBorderlessExpandLevel | print-borderless-expandlevel | cij-print-borderless-expandlevel |
| Function 2 | ... | ... | ... | ... |
| Function 3 | ... | ... | ... | |

```
<?xml version="1.0" encoding="UTF-8"?>
<PrintDeviceCapabilities
    :
    version="2">
    <psk:PageMediaSize psf2:psftype="Feature">
        <psk:NorthAmericaLetter psf2:psftype="Option" psf2:default="false">
            :
        </psk:NorthAmericaLetter>
        :
    </psk:PageMediaSize>
    <psk:PageBorderless psf2:psftype="Feature">  ~602
        <psk:None psf2:psftype="Option" psf2:default="true"/>  ~603
        <psk:Borderless psf2:psftype="Option"/>
    </psk:PageBorderless>
    :                                                                           604
    <psf2:InvalidCombination>
        <psf2:InvalidCombinationEntry psf2:feature="psk:PageBorderless" psf2:option="psk:Borderless"/>
        <psf2:InvalidCombinationEntry psf2:feature="psk:PageMediaSize" psf2:option="psk:NorthAmericaLetter"/>
    </psf2:InvalidCombination>
</PrintDeviceCapabilities>
```

FIG.6B 605

```
<?xml version="1.0" encoding="UTF-8"?>
<PrintDeviceCapabilities
    xmlns:ns0001="http://www.canon.com/ns/printschema/inkjet/v100"  ~606
    :
    version="2">
    <psk:PageMediaSize psf2:psftype="Feature">
        <psk:NorthAmericaLetter psf2:psftype="Option" psf2:default="false">
            :
        </psk:NorthAmericaLetter>
        :
    </psk:PageMediaSize>
    <psk:PageBorderless psf2:psftype="Feature">
        <psk:None psf2:psftype="Option" psf2:default="true"/>
        <psk:Borderless psf2:psftype="Option"/>
    </psk:PageBorderless>
    <ns0001:PageBorderlessExpandLevel psf2:psftype="Feature">  ~607
        <ns0001:Level_0 psf2:psftype="Option" psf2:default="true"/>
        <ns0001:Level_1 psf2:psftype="Option"/>
        <ns0001:Level_2 psf2:psftype="Option"/>
    </ns0001:PageBorderlessExpandLevel>
    :
    <psf2:InvalidCombination>
        <psf2:InvalidCombinationEntry psf2:feature="psk:PageBorderless" psf2:option="psk:Borderless"/>
        <psf2:InvalidCombinationEntry psf2:feature="psk:PageMediaSize" psf2:option="psk:NorthAmericaLetter"/>
    </psf2:InvalidCombination>
</PrintDeviceCapabilities>
```

FIG.7

| Expansion function | Feature name | OS feature name |
|---|---|---|
| Function 1 | PageBorderlessExpandLevel | PageBorderlessExLevel |
| Function 2 | : | : |
| Function 3 | : | : |

FIG.8A

| Added function | Feature name | OS feature name |
|---|---|---|
| Function 1 | PageBorderlessExpandLevel | cij-print-borderless-expandlevel |
| Setting value 1 | Level_0 | level0 |
| Setting value 2 | Level_1 | level1 |
| Setting value 3 | Level_2 | level2 |
| Function 2 | : | : |
| Setting value 2 | : | : |

802 – Feature name; 803 – OS feature name; 801; 804; 805

FIG.8B

| Added function | Feature name | OS feature name |
|---|---|---|
| Function 1 | PageBorderlessExLevel | cij-print-borderless-expandlevel |
| Setting value 1 | Level_0 | none |
| Setting value 2 | Level_1 | none |
| Setting value 3 | Level_2 | level2 |
| Function 2 | : | : |
| Setting value 2 | : | : |

| Added function | Feature name | OS feature name |
|---|---|---|
| Function 1 | PageBorderlessExpandLevel | none |
| Setting value 1 | Level_0 | none |
| Setting value 2 | Level_1 | none |
| Setting value 3 | Level_2 | none |
| Function 2 | : | : |
| Setting value 2 | : | : |

```
<?xml version="1.0" encoding="UTF-8"?>
<psf:PrintCapabilities
 xmlns:ns0001="http://www.canon.com/ns/printschema/cij/v100">
 <psf:Feature name="psk:PageMediaSize" >
  ..
  <psf:Option name="psk:NorthAmericaLetter" constrained="psk:None"> .. </psf:Option>
 </psf:Feature>
 ..
 <psf:Feature name="psk:PageBorderless">
  <psf:Option name="psk:Borderless" constrained="psk:PrintTicketSettings"> .. </psf:Option>
  <psf:Option name="psk:None" constrained="psk:None"> .. </psf:Option>
 </psf:Feature>
 ..
</psf:PrintCapabilities>
<psf:Feature name="ns0000:PageBorderlessExpandLevel">~902
 <psf:Option name="ns0000:Level_0" constrained="psk:None"> .. </psf:Option>
 <psf:Option name="ns0000:Level_1" constrained="psk:None"> .. </psf:Option>
 <psf:Option name="ns0000:Level_2" constrained="psk:None"> .. </psf:Option>
</psf:Feature>
..
</psf:PrintCapabilities>
```

901

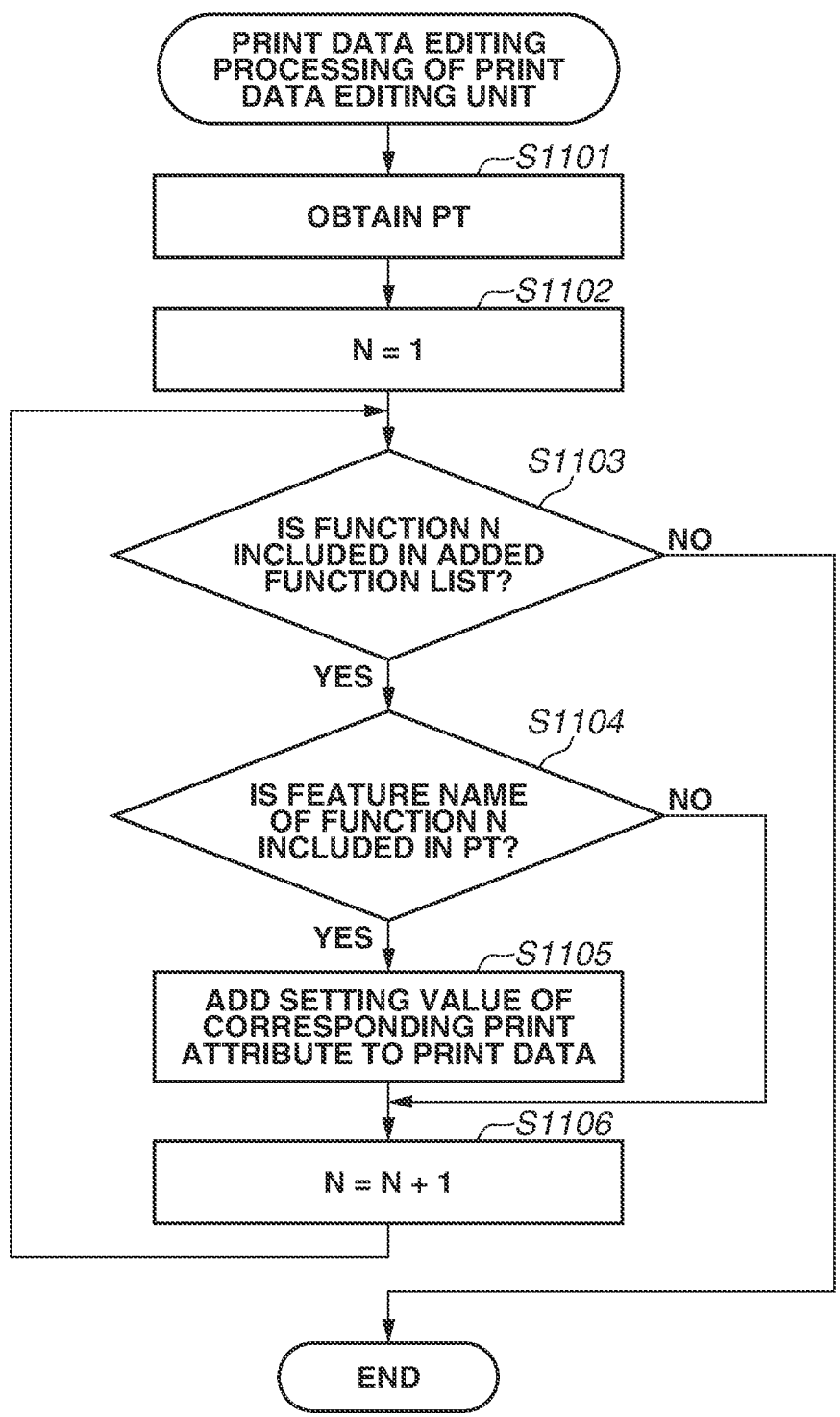

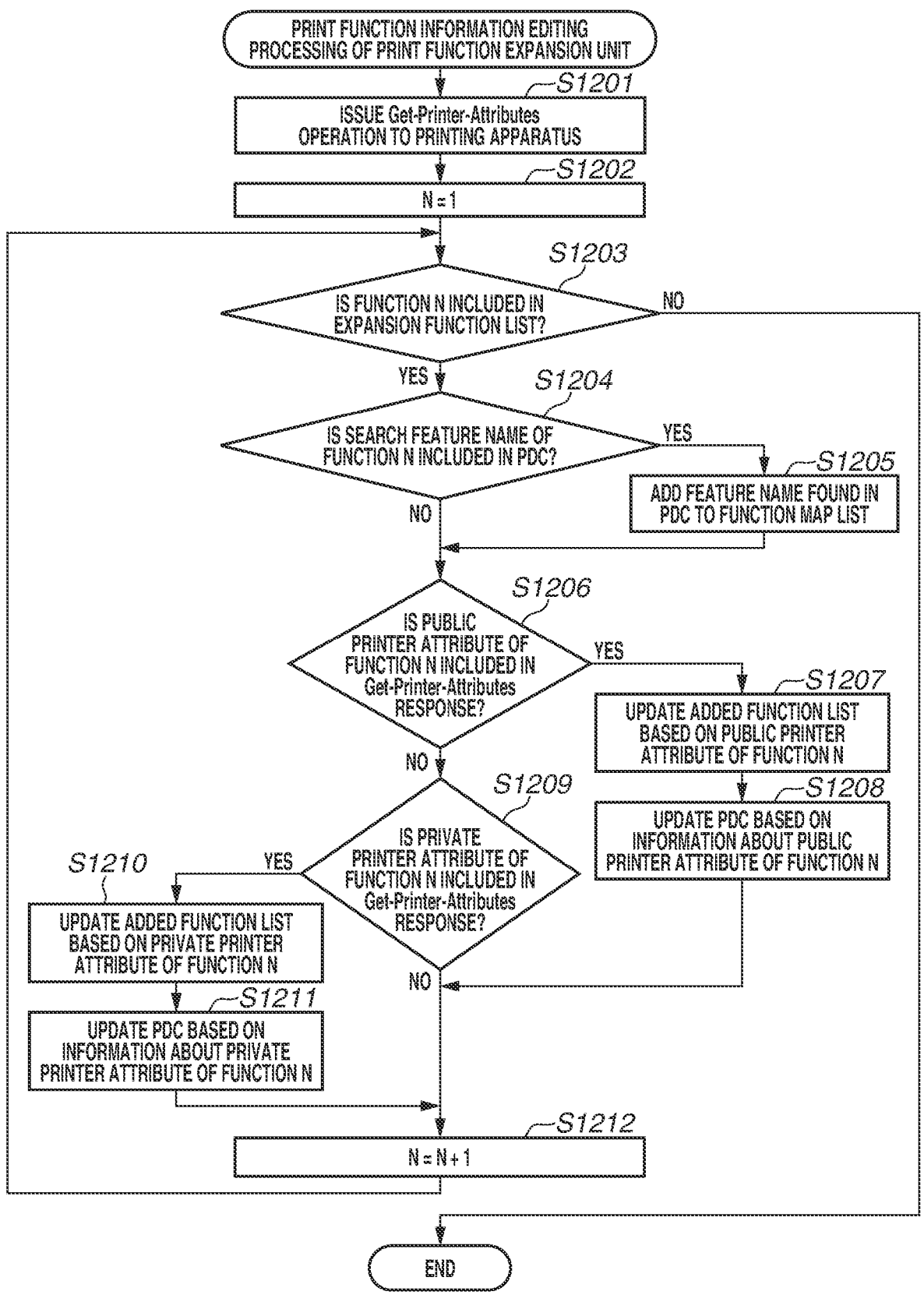

```
<?xml version="1.0" encoding="UTF-8"?>
<PrintDeviceCapabilities
    :
    version="2">
    <psk:PageMediaSize psf2:psftype="Feature">
        <psk:NorthAmericaLetter psf2:psftype="Option" psf2:default="false">
            :
        </psk:NorthAmericaLetter>
        :
    </psk:PageMediaSize>
    <psk:PageBorderless psf2:psftype="Feature">
        <psk:None psf2:psftype="Option" psf2:default="true"/>
        <psk:Borderless psf2:psftype="Option"/>
    </psk:PageBorderless>
    <ns0000:PageBorderlessExLevel psf2:psftype="Feature">   ~1302
        <ns0000:Level_0 psf2:psftype="Option" psf2:default="true"/>
        <ns0000:Level_1 psf2:psftype="Option"/>
    </ns0000:PageBorderlessExLevel>
    :
    <psf2:InvalidCombination>
        <psf2:InvalidCombinationEntry psf2:feature="psk:PageBorderless" psf2:option="psk:Borderless"/>
        <psf2:InvalidCombinationEntry psf2:feature="psk:PageMediaSize" psf2:option="psk:NorthAmericaLetter"/>
    </psf2:InvalidCombination>
</PrintDeviceCapabilities>
```

FIG.13B

```xml
<?xml version="1.0" encoding="UTF-8"?>
<PrintDeviceCapabilities
    xmlns:ns0001="http://www.canon.com/ns/printschema/inkjet/v100"
    :
    version="2">
    <psk:PageMediaSize psf2:psftype="Feature">
        <psk:NorthAmericaLetter psf2:psftype="Option" psf2:default="false">
            :
        </psk:NorthAmericaLetter>
        :
    </psk:PageMediaSize>
    <psk:PageBorderless psf2:psftype="Feature">
        <psk:None psf2:psftype="Option" psf2:default="true"/>
        <psk:Borderless psf2:psftype="Option"/>
    </psk:PageBorderless>
    <ns0000:PageBorderlessExLevel psf2:psftype="Feature">
        <ns0000:Level_0 psf2:psftype="Option" psf2:default="true"/>
        <ns0000:Level_1 psf2:psftype="Option"/>
        <ns0001:Level_2 psf2:psftype="Option"/>
    </ns0000:PageBorderlessExLevel >
    :
    <psf2:InvalidCombination>
        <psf2:InvalidCombinationEntry psf2:feature="psk:PageBorderless" psf2:option="psk:Borderless"/>
        <psf2:InvalidCombinationEntry psf2:feature="psk:PageMediaSize" psf2:option="psk:NorthAmericaLetter"/>
    </psf2:InvalidCombination>
</PrintDeviceCapabilities>
```

NON-TRANSITORY COMPUTER-READABLE STORAGE MEDIUM, CONTROL METHOD, AND INFORMATION PROCESSING APPARATUS FOR DISPLAYING INFORMATION RELATED TO A FUNCTION

CROSS-REFERENCE TO RELATED APPLICATIONS

This application is a Continuation of U.S. patent application Ser. No. 17/119,525, filed Dec. 11, 2020, which claims the benefit of Japanese Patent Application No. 2019-239038, filed Dec. 27, 2019, both of which are hereby incorporated by reference herein in their entirety.

BACKGROUND OF THE INVENTION

Field of the Invention

The present invention relates to a control method and an information processing apparatus. In particular, the present invention relates to a technique for an expansion application.

Description of the Related Art

Software for controlling a printing apparatus has been known. The software issues a print instruction to a printing apparatus connected to a host computer by using a printer driver installed on the host computer. An operating system (OS) that is basic software is installed on the host computer. The printer driver is configured according to specifications defined by the OS, and runs when called by the OS. Vendors providing printing apparatuses can provide means for issuing a print instruction to the printing apparatuses using the OS by providing printer drivers conforming to the OS specifications.

In recent years, Windows® has provided a standard class driver (hereinafter, also referred to as a "standard driver") that can be used in common with printing apparatuses provided by multiple vendors. Such a standard driver is included in an OS package, and the driver can easily be used by connecting a printing apparatus to the host computer. This conveniently eliminates the need to install a model-specific printer driver suitable for the printing apparatus separately. Print functions can be specified to the standard driver depending on PrintCapabilities generated based on information obtained from the connected printing apparatus. A user who uses the standard driver can thus designate the print functions corresponding to the capabilities of the connected printing apparatus despite the use of a single standard driver.

The standard driver can be associated with a function-expanding application (hereinafter, also referred to as an "expansion application"). The expansion application can be provided by a vendor providing the printing apparatus. By the provision of the expansion application, the vendor can provide functions (expansion functions) unable to be implemented by the standard driver alone. Japanese Patent Application Laid-Open No. 2019-74906 discusses a technique for expanding a function such as a stamping function by an expansion application.

SUMMARY OF THE INVENTION

The expansion application discussed in Japanese Patent Laid-Open No. 2019-74906 can edit a spool file to be passed to a standard driver. The expansion application thus implements a stamping function by editing the spool file to insert a stamp. The spool file is converted into print data (in Japanese Patent Laid-Open No. 2019-74906, referred to as a print command) by the standard driver and transmitted to a printing apparatus.

However, further contrivances may be desirable for the expansion application, which expands functions of the standard driver, to provide a better function.

An aspect of the present invention is to eliminate the above-mentioned problem with conventional technology.

A feature of the present invention is to provide a technique for an expansion application for expanding a function of a standard driver to provide a better function.

According to a first aspect of the present invention, there is provided a control method of an information processing apparatus on which an expansion application configured to expand a function of print data generation software configured to generate print data runs, the control method comprising: obtaining attribute data on a printing apparatus, the attribute data being output from the printing apparatus; obtaining data indicating a print function; and adding information related to a specific function based on attribute information included in the obtained attribute data if information indicating the specific function is not included in the obtained data indicating the print function, wherein a setting screen including a setting item of the specific function is displayed based on the added information related to the specific function.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram illustrating a hardware configuration of a printing system.

FIG. 3 is a flowchart illustrating print function information editing processing of a print function expansion unit.

FIGS. 4A and 4B illustrate an example of a Get-Printer-Attributes response and an example of Validate-Job operation data.

FIG. 5 illustrates an example of an expansion function list

FIGS. 6A and 6B illustrate examples of Print Device Capabilities (PDC).

FIG. 7 illustrates an example of a function map list.

FIGS. 8A to 8C illustrate examples of an added function list.

FIG. 9 illustrates an example of PrintCapabilities.

FIG. 11 is a flowchart illustrating print data editing processing of a print data editing unit.

FIG. 12 is a flowchart illustrating print function information editing processing of a print function expansion unit.

FIGS. 13A and 13B illustrate examples of the PDC.

DESCRIPTION OF THE EMBODIMENTS

Figure 2A:
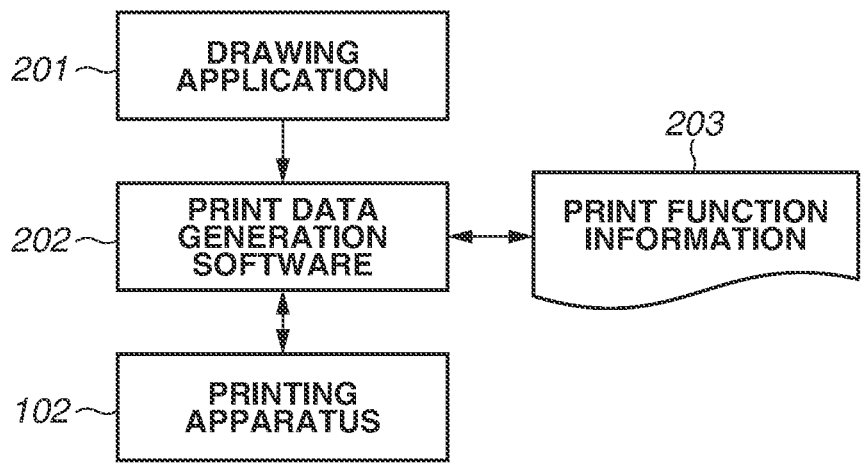
FIGS. 2A and 2B are block configuration diagrams of the printing system.

Exemplary embodiments will now be described in detail with reference to the accompanying drawings. The following exemplary embodiments are not intended to limit the invention set forth in the claims. While the exemplary embodiments describe a plurality of features, not all of the plurality of features is indispensable to the invention, and the plurality of features may be freely combined. In the accompanying drawings, the same or similar components are designated by the same reference numerals. A redundant description will be omitted.

First Embodiment

Hardware Configuration of Printing System

FIG. 1 is a block diagram illustrating a hardware configuration of a printing system according to a first exemplary embodiment. In the diagram, a host computer 101 is an example of an information processing apparatus. The host computer 101 includes an input interface 110, a central processing unit (CPU) 111, a read-only memory (ROM) 112, a random access memory (RAM) 113, an external storage device 114, an output interface 115, and an input/output interface 116. Input devices, such as a keyboard 118 and a pointing device 117, are connected to the input interface 110. A display device, such as a display unit 119, is connected to the output interface 115.

The ROM 112 stores an initialization program. The external storage device 114 stores a group of application programs, an operating system (OS), print data generation software, and other various types of data. The RAM 113 works as, for example, a work memory for various programs stored in the external storage device 114 executes.

In the present exemplary embodiment, the CPU 111 performs functions of the host computer 101 and processes related to a flowchart, by performing processing based on the procedures of programs stored in the ROM 112. The functions of the host computer 101 and the flowchart will be described below. A printing apparatus 102, which is a device, is connected to the host computer 101 via the input/output interface 116. In this example, the host computer 101 and the printing apparatus 102 are separately configured. However, the host computer 101 and the printing apparatus 102 may be configured as a single information processing apparatus. The printing apparatus 102 will be described as an inkjet printer, which performs printing by discharging ink to a sheet surface, as an example. However, other methods (e.g., electrophotographic method) may be used for performing printing. The host computer 101 may also be a desktop personal computer, a smartphone, or a notebook personal computer.

Configuration of Printing System

Figure 2B:
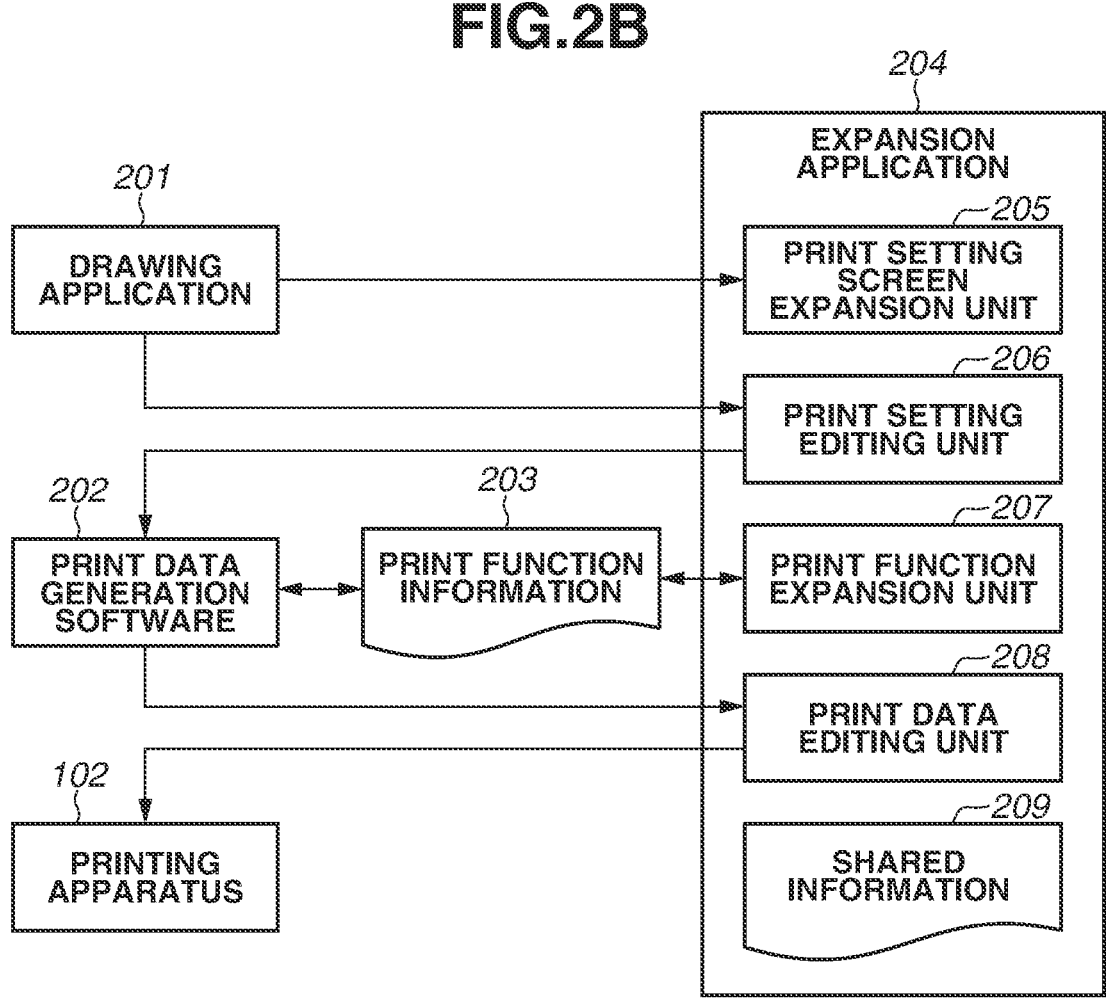

FIGS. 2A and 2B are diagrams schematically illustrating a configuration of the printing system. The following description will be given on the assumption that the printing system uses a host computer 101 on which Microsoft® Windows® 10 is installed as an OS. FIG. 2A is a diagram illustrating a typical configuration in a case where an expansion application 204 is not associated with print data generation software 202 and the printing apparatus 102.

A drawing application 201 is software for generating contents (drawing data) to be printed. Examples of the software include a document generation application and a spreadsheet application. If the drawing application 201 receives a print request from a user, the drawing application 201 issues a print instruction to the OS. The print instruction includes print setting information for giving instructions about operation of the print data generation software 202 and the printing apparatus 102. The print setting information is also referred to as a PrintTicket (hereinafter, PT).

To output the print setting information, the drawing application 201 can display a print setting screen provided any one of the print data generation software 202, the OS, and the drawing application 201. The print setting screen includes setting items (hereinafter, also referred to as "control items") indicating settable print functions and control items indicating setting values of the print functions, based on capability information (information that can be set as print settings) obtained from the print data generation software 202. The capability information is also referred to as PrintCapabilities (PC). The print data generation software 202 determines the PC based on print function information 203. The print function information 203 is data indicating print function. The data describes all settable print functions and setting values of the print functions, and an exclusive relationship between the setting values. The print function information 203 is also referred to as Print Device Capabilities (PDC). The print function information 203 is included in a configuration file of the print data generation software 202, and located in the external storage device 114 as an immutable file. Alternatively, the print function information 203 can be dynamically generated by the print data generation software 202. Specifically, the print data generation software 202 or the OS can be configured to obtain attribute data on the printing apparatus 102 from the printing apparatus 102, and generate the print function information 203 based on attribute information included in the obtained attribute data. In a case where the print function information 203 is dynamically generated, the generated print function information 203 can be edited. The attribute data on the printing apparatus 102 obtained from the printing apparatus 102 will be described below with reference to FIG. 4A.

As described above, the print data generation software 202 can be configured such that the user can designate a print function or functions usable by each printing apparatus 102, depending on the printing apparatus 102 connected. More specifically, the print data generation software 202 can be configured such that the user can designate usable print functions depending on the connected printing apparatuses, even if printing apparatuses having different functions or printing apparatuses developed by different vendors are connected. In the following description, a configuration using the Internet Printing Protocol (IPP) Class Driver included in Windows 10 will be described as the print data generation software 202. The IPP Class Driver is a printer driver for performing print processing according to a standard printing protocol specification called IPP. The IPP Class Driver is included in the OS package. The IPP Class Driver is not a printer driver specific to the model of the printing apparatus 102, but a standard class driver usable by a plurality of printing apparatuses in common. The IPP Class Driver obtains the attribute data on the connected printing apparatus 102 and generates the print function information 203 based on the attribute data so that the user can designate a print function or functions supported by the connected printing apparatus 102.

The OS generates intermediate data (also referred to as input data) based on the print instruction output from the drawing application 201, and passes the intermediate data to the print data generation software 202. The data that the drawing application 201 outputs for printing is Graphic Device Interface (GDI) data or Extensible Markup Language (XML) Paper Specification (XPS) data. In a case where the IPP Class Driver is used as the print data generation software 202 and the data output from the drawing application 201 is GDI data, the OS converts the GDI data output from the drawing application 201 into XPS data. The OS then passes the converted XPS data to the print data generation software 202 as intermediate data. In a case where the data output from the drawing application 201 is XPS data, the OS passes the XPS data to the print data generation software 202 as intermediate data. The intermediate data includes drawing data, which is information about the picture to be formed on a sheet surface, and the print setting information set by the user.

The print data generation software 202 converts the obtained intermediate data into print data interpretable by the printing apparatus 102, and transmits the print data to the printing apparatus 102. The print data includes the drawing data, which is the information about the picture to be formed on the sheet surface, and print setting attribute information generated based on the print setting information set by the user. The print setting attribute information is attribute information for designating print settings. Details will be described below with reference to FIG. 4B.

The printing apparatus 102 performs printing on the sheet surface based on the print data transmitted from the print data generation software 202. Here, the printing apparatus 102 prints the drawing data included in the print data on the sheet surface through operations based on the print setting attribute information included in the print data. The print setting attribute information includes attribute information and setting values of the attribute information. The attribute information designates print quality (e.g., image quality priority, and speed priority), and print settings (e.g., two-sided printing). For example, in a case where the print setting attribute information includes attribute information for designating two-sided printing, the printing apparatus 102 performs two-sided printing.

FIG. 2B is a diagram illustrating a configuration in a case where the expansion application 204 is associated with the print data generation software 202 and the printing apparatus 102. Note that components and processes not mentioned below are similar to those illustrated in FIG. 2A.

The expansion application 204 is software for expanding the functions of the print data generation software 202 and is not included in (not packaged with) the OS in advance. The user therefore operates the host computer 101 to download the expansion application 204 from a server vie the Internet and install the expansion application 204. Alternatively, the expansion application 204 may be automatically installed in response to connection of the printing apparatus 102 to the host comp 101. Specifically, when the printing apparatus 102 is connected to the host computer 101, the OS obtains device identification information from the printing apparatus 102. The OS may download the expansion application 204 corresponding to the obtained device identification information from the server via the Internet and install the expansion application 204. In other words, the print data generation software 202 and the expansion application 204 are stored in the host computer 101 as separate files.

The print data generation software 202 and the expansion application 204 can be updated for upgrade. Such update processes are performed at respective different timings. Specifically, the timing when the host computer 101 obtains the print data generation software 202 is different from the timing when the host computer 101 obtains the expansion application 204. The trigger for the host computer 101 to obtain the print data generation software 202 is also different from the trigger to obtain the expansion application 204. When the expansion application 204 is installed, the OS associates the expansion application 204 with the print data generation software 202 and the printing apparatus 102.

The expansion application 204 described in the present exemplary embodiment includes a print setting screen expansion unit 205, a print setting editing unit 206, a print function expansion unit 207, and a print data editing unit 208. The expansion application 204 also includes shared information 209 accessible from the foregoing units in common. The shared information 209 is a file stored in the external storage device 114 or information stored in the RAM 113. The expansion application 204 writes information to or reads information from the shared information 209 by using an application program interface (API) provided by the OS.

The operation of the expansion application 204 may be terminated each time the processing of each unit ends. In such a case, the OS activates the expansion application 204 each time a request to use one of the units is given. Alternatively, for example, the OS may terminate the operation of the expansion application 204 when the processing of the print setting screen expansion unit 205 ends, while the OS maintains the expansion application 204 activated even when the processing of the print setting editing unit 206 ends.

When the drawing application 201 receives a print instruction from the user, the drawing application 201 issues a print instruction to the OS. In the present configuration, similar to the configuration of FIG. 2A, the drawing application 201 can display a print setting screen. In the present configuration, the drawing application 201 displays a print setting screen provided by the expansion application 204. Specifically, the drawing application 201 displays a print setting screen provided by the print setting screen expansion unit 205 included in the expansion application 204. Whether to display the print setting screen provided by the print setting screen expansion unit 205 depends on the user's operation. The print setting screen expansion unit 205 will be described in detail below with reference to FIG. 10.

The OS generates intermediate data based on the print instruction output from the drawing application 201, and passes the intermediate data to the print setting editing unit 206. The print setting editing unit 206 edits print setting information (PT) included in the generated intermediate data, and passes the edited print setting information to the OS. The print setting editing unit 206 can display or not display a screen on the display unit 119. The print setting editing unit 206 can determine whether to display the screen provided by the print setting editing unit 206 on the display unit 119 regardless of the user's operation. Settings and functions to be always designated by the user for each print job are therefore desirably configured such that the user can designate the settings and functions on the screen displayed by the print setting editing unit 206. Examples of such settings and functions include secure printing using a personal identification number (PIN), and information about the destination of FAX transmission (e.g., a destination address, and a facsimile (FAX) number). In the present example, the print setting editing unit 206 stores PIN information designated by the user into the print setting information, and passes the print setting information to the OS. The PIN information designated by the user may be stored in the shared information 209 accessible from the units in common.

The OS passes the intermediate data including the edited print setting information to the print data generation software 202. The print data generation software 202 converts the intermediate data into print data interpretable by the printing apparatus 102. The OS passes the converted print data to the print data editing unit 208. The OS may be further configured to pass the print setting information included in the intermediate data to the print data editing unit 208.

The print data editing unit 208 edits the print data generated by the print data generation software 202, and passes the edited print data to the OS. Take secure printing as an example. The print data editing unit 208 reads PIN information designated by the print setting editing unit 206 from the print setting information received from the OS or reads the PIN information from the shared information 209, and adds the PIN information to the print setting attribute information included in the print data.

The OS transmits the print data edited by the print data editing unit 208 to the printing apparatus 102. The printing apparatus 102 performs printing on a sheet surface based on the print data transmitted from the print data editing unit 208.

The expansion application 204 includes the print function expansion unit 207. The print function expansion unit 207 can edit the print function information 203 (PDC) generated by the print data generation software 202 or the OS. The print function expansion unit 207 can thereby add a function provided by the expansion application 204, add a function supported by the printing apparatus 102 but not by the print data generation software 202, and/or add an exclusive relationship between setting values of print functions. The OS activates the print function expansion unit 207 when the expansion application 204 is first associated with the printing apparatus 102 and the print data generation software 202. The OS may also activate the print function expansion unit 207 at other timing, such as when the OS is activated. This enables the print function expansion unit 207 to detect an expansion function and add the expansion function to the print function information 203 in a case where an option device (e.g., a finisher) is added to the printing apparatus 102 afterward and a print-related function is expanded.

The configuration of the expansion application 204 for implementing the present exemplary embodiment is not limited to the one including all the foregoing functions (units). The expansion application 204 may include only some of the functions or include other functions. The expansion application 204 is sometimes referred to simply as print software. As described above, the expansion application 204 includes at least one of the following functions: displaying a setting screen (print setting screen expansion unit 205), editing intermediate data to be input to the print data generation software 202 (print setting editing unit 206), editing print data to be input to the printing apparatus 102 (print data editing unit 208), and expanding a function that can be designated by the print data generation software 202 (print function expansion unit 207).

Print Function Information Editing Processing of Print Function Expansion Unit

FIG. 3 is a flowchart illustrating a main processing procedure in print function information editing processing performed by the print function expansion unit 207 of the present printing system. In the following description, the print function expansion unit 207 may be described as the agent of the processes, whereas the corresponding functions are actually implemented by the CPU 111 executing the respective corresponding programs.

The procedure described in FIG. 3 is started by the OS activating the print function expansion unit 207 at timing when the expansion application 204 is first associated.

In step S301, the print function expansion unit 207 issues an IPP Get-Printer-Attributes operation to the printing apparatus 102. A response received from the printing apparatus 102 by this operation is stored in the RAM 113. The print function expansion unit 207 may directly issue the IPP Get-Printer-Attributes operation, or makes the OS issue the IPP Get-Printer-Attributes operation by using the API of the OS. The Get-Printer-Attribute operation is capable of designation of the attributes to be requested. The response received from the printing apparatus 102 is data indicating the attributes of the printing apparatus 102. An example of the response will be described below with reference to FIG. 4A. The print function expansion unit 207 may request only the attributes illustrated in FIG. 4A that are used in processing to be described below, or request all attributes without any attribute designation.

In step S302, the print function expansion unit 207 initializes N to 1. N=1 indicates that function 1, which is the first function, is to be processed.

In step S303, the print function expansion unit 207 checks whether function N is included in an expansion function list. An example of the expansion function list will be described with reference to FIG. 5. FIG. 5 illustrates an expansion function list 501, which is stored in the external storage device 114 as one of configuration files of the expansion application 204. The expansion function list 501 lists functions to be added by the expansion application 204, listing a correspondence between feature names in a PT and the names of IPP printer attributes. A printer attribute refers to attribute information indicating a function of the printing apparatus 102 that can be designated (capability of the printing apparatus 102). The feature names on the expansion function list 501 may also include information about a namespace as appropriate. The same applies to subsequent processing for storing a feature name of the expansion function list 501. Since the expansion function list 501 illustrated in FIG. 5 includes a record related to function 1, the determination result of step S303 becomes YES.

In step S304, the print function expansion unit 207 determines whether the search feature name of function N on the expansion function list 501 is included in the PDC. The print function expansion unit 207 can refer to or modify the PDC.

FIG. 6A illustrates an example of the PDC. A PDC 601 illustrated in FIG. 6A includes information about supported functions (Feature), information about setting values (Option) of specific functions, and exclusion information indicating that specific functions are not selectable at the same time. Information 602 indicates that a borderless printing function (PageBorderless) is supported. Information 603 indicates that two setting values "None" and "Borderless" can be designated for the borderless printing function. PageBorderless is preceded by "psk:", which represents a namespace and indicates who has defined the function PageBorderless in what specification. Information 604 represents exclusion information indicating that the Borderless setting and a medium size NorthAmericaLetter are not selectable at the same time.

Return to the processing of step S304. Since the search feature name of function 1 on the expansion function list 501 illustrated in FIG. 5 is *BorderlessEx*, the print function expansion unit 207 searches the PDC for a feature name (function-indicating information) including BorderlessEx. The symbol * represents an arbitrary character string. As described above, the PDC, which is the print function information 203, can be dynamically generated by the OS or the print data generation software 202 based on the information obtained from the printing apparatus 102. What feature name a print function is added in therefore depends on the specifications of the OS or the print data generation software 202. The print function expansion unit 207 can more reliably search for the corresponding function by searching for a partial match with the feature name as described above.

If the determination of step S304 is YES, function N has already been added as a function that can be designated to the PDC, which is the print function information 203, by the OS or the print data generation software 202. In such a case (YES in step S304), the processing proceeds to step S305. In contrast, if the PDC has contents, such as those of the PDC 601, there is no feature name including the name BorderlessEx in the PDC 601. In such a case (NO in step S304), the processing proceeds to step S306.

In step S305, the print function expansion unit 207 adds the feature name found in the PDC to a function map list. An example of the function map list will be described with reference to FIG. 7. FIG. 7 illustrates a function map list 701, which is an example of the function map list. The function map list 701 is stored in the shared information 209 that the units of the expansion application 204 can read and write. The print function expansion unit 207 stores a feature name 703 found in the PDC by the search in step S304 and a feature name 702 of the corresponding function on the expansion function list 501 in association with each other. This enables the expansion application 204 to determine that the function added by the OS or the print data generation software 202 and the function added by the print function expansion unit 207 in processing described below represent the same function. The feature name 703 in the PDC may be configured to be stored with the namespace included as appropriate.

After step S305, the processing proceeds to step S312. In step S312, the print function expansion unit 207 proceeds to the processing of the next function on the expansion function list 501 (N=N+1).

In step S306, the print function expansion unit 207 determines whether a public printer attribute of function N on the expansion function list 501 is included in the Get-Printer-Attributes response stored in the RAM 113 in step S301. The public printer attribute is a standard printer attribute defined in the IPP specification.

FIG. 4A schematically illustrates an example of the Get-Printer-Attributes response. A Get-Printer-Attributes response 401 includes printer attributes, such as media-supported and cij-print-borderless-expandlevel. In other words, the Get-Printer-Attribute response 401 is attribute information indicating functions of the printing apparatus 102 that can be designated (capabilities of the printing apparatus 102). Information 402 is a list of medium sizes that can be designated in the printing apparatus 102. The information 402 indicates that Letter size (na_letter_8.5×11 in) is supported. Information 403 indicates combinations of possible print margins of the printing apparatus 102. The information 403 indicates that the printing apparatus 102 supports the borderless printing function, because all the combinations of the top, left, right, and bottom margins include 0. Information 404 represents a protruding amount function during borderless printing (borderless protruding amount function). The information 404 indicates that one of three levels level0, level1, and level2 can be selected. A printer attribute starting with cij is a private printer attribute originally defined by the vendor developing the printing apparatus 102, not a standard public printer attribute defined in the IPP specification.

The PDC 601 is an example of the PDC generated by the OS or the print data generation software 202 based on the response 401. The information (printer attribute) 403 included in the response 401 is a public printer attribute. Since the public printer attribute is a standard one defined in the IPP specification, information 602 related to the borderless printing function is added to the PDC 601 by the OS or the print data generation software 202 based on the information (printer attribute) 403 if the OS supports the function (borderless printing function). However, some functions can be unsupported by the OS despite their public printer attributes. In such a case, the OS or the print data generation software 202 is unable to interpret the printer attributes, and the functions corresponding to the printer attributes are not included in the PDC 601. The information (printer attribute) 404 included in the response 401 is a private printer attribute. Since the private printer attribute is attribute information unique to the vendor, the OS or the print data generation software 202 is unable to interpret the private printer attribute. In such a case, the function corresponding to the printer attribute 404 is thus not included in the PDC 601, either. The processing performed by the print function expansion unit 207 in steps S306 to S311 is intended to add such functions to the PDC 601.

Return to the description of step S306. The Get-Printer-Attributes response 401 does not include print-borderless-expandlevel, which is the public printer attribute of function 1, on the expansion function list 501. The determination of step S306 is therefore NO, and the processing proceeds to step S309.

In step S309, the print function expansion unit 207 checks whether the private printer attribute of function N on the expansion function list 501 is included in the Get-Printer-Attributes response 401 stored in the RAM 113 in step S301. The Get-Printer-Attributes response 401 includes cij-print-borderless-expandlevel (information 404 illustrated in FIG. 4A), which is the private printer attribute of function 1, on the expansion function list 501. The determination of step S309 is therefore YES, and the processing proceeds to step S310.

In step S310, the print function expansion unit 207 updates an added function list based on the information about the private printer attribute of function N on the expansion function list 501. An example of the added function list will be described with reference to FIG. 8A. FIG. 8A illustrates an added function list 801, which is stored in the shared information 209 that the units of the expansion application 204 can read and write. The print function expansion unit 207 stores, on the expansion function list 501, the feature name of function N and the private printer attribute in association with each other. In this example, the print function expansion unit 207 stores a feature name 802, which is PageBorderlessExpandLevel of function 1 on the expansion function list 501, and a private printer attribute name 803, which is cij-print-borderless-expandlevel on the expansion function list 501, in association with each other. The print function expansion unit 207 further stores the setting values of the printer attribute cij-print-borderless-expandlevel in the response 401, e.g., level0, level1, and level2 as setting values 805 of the printer attribute of function 1. The print function expansion unit 207 also determines options 804 of the feature to be associated, and stores the setting values of the printer attribute of function 1 in association with the options 804. The print function expansion unit 207 retains combinations of options that can be designated for specific features as information in advance, and determines the options 804 based on the information. Alternatively, the print function expansion unit 207 may set the same values as the setting values 805 of the printer attribute in the options 804.

Such processing enables the expansion application 204 to refer to a correspondence between the function expanded by the print function expansion unit 207 (expansion function) and the print setting attribute information to be notified to the printing apparatus 102 when the function is designated.

In step S311, the print function expansion unit 207 updates the PDC based on the information about the private printer attribute of function N on the expansion function list 501. FIG. 6B illustrates a PDC 605, which is an example of the PDC updated in the processing of step S311. The print function expansion unit 207 refers to the added function list 801 to determine the feature and options to be added, and updates the PDC. The print function expansion unit 207 adds the feature name 802 PageBorderlessExpandLevel and three pieces of options 804, which are the setting values (information related to the function) of the feature name 802, e.g., Level_0, Level_1, and Level_2, to the PDC based on the format of the PDC. Information 607 is an example of the added information. The print function expansion unit 207 further adds, to the PDC, namespace information 606 about the added function. If the corresponding namespace has already been added to the PDC, the print function expansion unit 207 does not add the namespace information 606. By such processing, the function PageBorderlessExpandLevel (borderless protruding amount function) for indicating the borderless protruding amount is added as a function that can be designated by the print data generation software 202.

In step S312, the print function expansion unit 207 adds 1 to N. The processing returns to step S303. The processing of steps S303 to S312 is repeated while there is function N on the expansion function list 501. If function N is determined to not be included in the expansion function list 501 in step S303 (NO in step S303), the processing of this flowchart ends.

If the Get-Printer-Attributes response 401 includes print-borderless-expandlevel (YES in step S306), the processing proceeds to step S307. In steps S307 and S308, the print function expansion unit 207 performs similar processing to that performed based on the private printer attribute in steps S310 and S311, based on the public printer attribute. Specifically, the public printer attribute name print-borderless-expandlevel is stored as the printer attribute of function N in the added function list 801.

The above is the print function information edit processing of the print function expansion unit 207. By using this processing, functions supported by the printing apparatus 102 can be expanded as those of the print data generation software 202. The expanded functions can be designated by the user on a print setting screen illustrated in FIG. 10 described below. Even in a case where printing apparatuses 102 return different printer attributes for a specific function, the functions can be expanded as the same function. In the flowchart illustrated in FIG. 3, two types of printer attributes, e.g., a public printer attribute and a private printer attribute, are added as the same function. However, the types of printer attributes are not limited to the two. Two or more types of other printer attributes with different names can be expanded as the same function. In the flowchart illustrated in FIG. 3, if a function has already been added to the PDC by the OS or the print data generation software 202, the print function expansion unit 207 does not add the function to the PDC redundantly. In other words, a plurality of attributes to be handled as the same function is always added to the print data generation software 202 as a single function. In addition, setting values that can be designated by the connected printing apparatus 102 are added as those of the function. A mechanism similar to that of the present procedure may be configured such that, if a function has already been added by the OS or the print data generation software 202 but with a setting value or values lacking, the print function expansion unit 207 originally adds only the setting value(s).

Example of PC

An example of the PC generated based on the PDC 605 expanded by the print function expansion unit 207 will now be described with reference to a PC 901 illustrated in FIG. 9. The PDC 601 is converted into the PC 901 by the OS or the print data generation software 202. Alternatively, the expansion application 204 may be configured to convert the PDC 601 into the PC 901. The PC 901 includes a feature 902 PageBorderlessExpandLevel that is added based on the information 607 (Feature), which has been added to the PDC 605 by the print function expansion unit 207.

Screen Example Displayed by Print Setting Screen Expansion Unit

Figure 10:
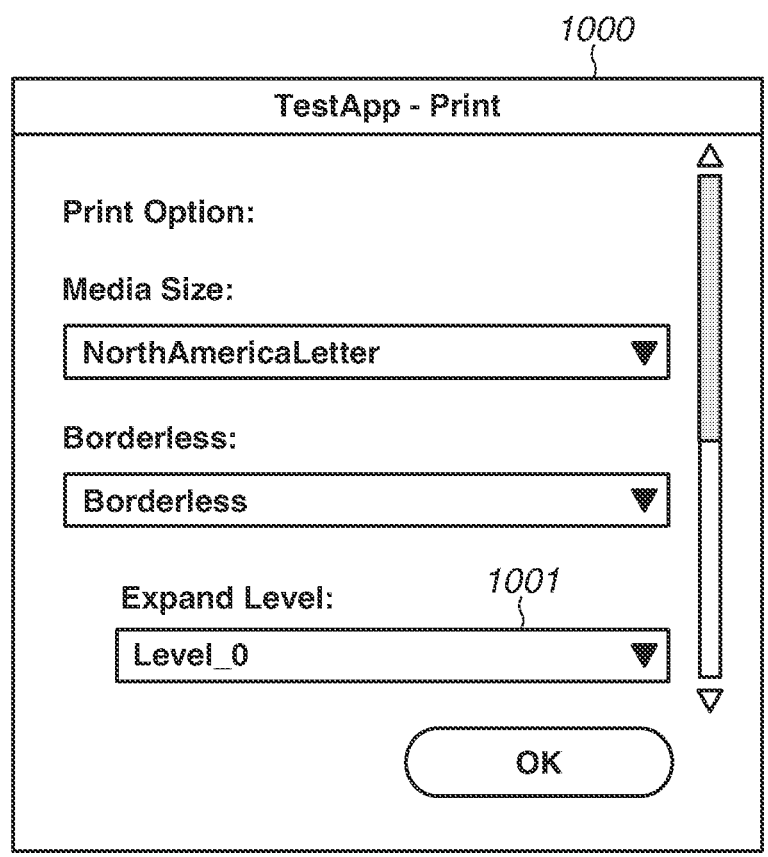
FIG. 10 illustrates an example of a screen displayed by a print setting screen expansion unit.

The print setting screen displayed based on the generated PC 901 will now be described with reference to FIG. 10. FIG. 10 illustrates a print setting screen 1000, which is an example of the screen that the print setting screen expansion unit 205 displays based on the PC 901. The print setting screen expansion unit 205 is called by the OS when the user gives an instruction to display a print setting screen from the drawing application 201. The print setting screen expansion unit 205 displays a screen on which the user can designate a print function that can be designated by the print data generation software 202, based on the PC obtainable from the OS.

Based on the feature 902 included in the PC 901, the print setting screen expansion unit 205 provides a print setting screen to which a control 1001 (setting item) for designating the protruding amount during borderless printing is added. The control 1001 is capable of selecting any one of three options of the feature 902, e.g., Level_0, Level_1, and Level_2.

In generating this print setting screen 1000, the print setting screen expansion unit 205 refers to the function map list 701 included in the shared information 209 and adds the same control for the two features associated. For example, the print setting screen expansion unit 205 adds the same control 1001 both in the case where the PC 901 includes the feature PageBorderlessExpandLevel and in the case where the PC 901 includes a feature PageBorderlessExLevel.

As described above, the print setting screen expansion unit 205 does not distinguish if a specific function is added by the OS or the print data generation software 202, added by the print function expansion unit 207 based on a public printer attribute returned from the printing apparatus 102, or added by the print function expansion unit 207 based on a private printer attribute returned from the printing apparatus 102. That is, the print setting screen expansion unit 205 can configure a single control from which the user can designate the function on the print setting screen. Moreover, the present exemplary embodiment is also applicable even in a case where an application not capable of distinguishing the foregoing three cases obtains the PC 901 directly and constitutes the print setting screen. Specifically, by obtaining the PC to which a specific function is added, the drawing application 201 can configure a single control from which the user can designate the function.

Processing Procedure of Print Data Editing Unit

Processing for editing print data (print data editing processing) will now be described. The processing is performed by the print data editing unit 208 after an instruction concerning print settings is given by the user on the print setting screen.

FIG. 11 is a flowchart illustrating a main processing procedure in the print data editing processing of the print data editing unit 208 in the present printing system. In the following description, the print data editing unit 208 may be described as the agent of the processes, whereas the corresponding functions are implemented by the CPU 111 executing the respective corresponding programs.

The procedure of FIG. 11 is started when the print data editing unit 208 is activated by the OS.

In step S1101, print data generated by the print data generation software 202 is passed to the print data editing unit 208. The print data editing unit 208 initially obtains a PT from the OS. The PT is information generated by the print setting screen expansion unit 205. The PT is print setting information indicating print settings that the user has designated based on the PC. The PT can be edited by the print setting editing unit 206, in which case the print data editing unit 208 can obtain the edited PT. The print data editing unit 208 may perform the following processing based not on the PT but on a PT included in the shared information 209 and on information equivalent to the PT. In such a case, the print setting screen expansion unit 205 or the print setting editing unit 206 stores the PT and the equivalent information in the shared information 209 so that the print data editing unit 208 can refer to the PT and the equivalent information afterward.

In step S1102, the print data editing unit 208 initializes N to 1.

In step S1103, the print data editing unit 208 determines whether function N is included in the added function list 801 in the shared information 209. Since function 1 is included in the added function list 801 here, the determination of step S1103 is YES. If function N is not included (NO in step S1103), the print data editing unit 208 determines that there is no more function to be added to the print data, and the processing ends. A case where function 1 is not included in the added function list 801 refers to where all the print settings designated by the user are standard functions, not expansion functions. Thus, this case refers to where all the print settings have already been processed by the print data generation software 202.

If function N is included (YES in step S1103), the processing proceeds to step S1104. In step S1104, the print data editing unit 208 determines whether the feature name of function N is included in the PT. If the feature name is not included (NO in step S1104), the processing proceeds to step S1106. Suppose here that the feature name of function 1, PageBorderlessExpandLevel, is included in the PT. If the feature name is included (YES in step S1104), the processing proceeds to step S1105.

In step S1105, the print data editing unit 208 refers to the added function list 801 and adds the setting value of the printer attribute corresponding to the option of the feature in the PT to the print setting attribute information (attribute information for designating print settings) included in the print data. FIG. 4B illustrates an example of the print setting attribute information in the IPP print data. Data 1401 indicates a Validate-Job operation, an operation issued at the beginning of the IPP print data. The data 1401 indicating the Validate-Job operation includes job-attributes-tag 1402 indicating the print setting attribute information. In the PT, Level_1 is designated as the option of PageBorderlessExpandLevel. The print data editing unit 208 refers to the added function list 801 in the shared information 209, and adds the setting value level1 corresponding to Level_1 as the setting value for the printer attribute name cij-print-borderless-expandlevel. Information 1403 represents information to be added. If a Print-Job operation is used instead of the Validate-Job operation or a series of operations, the print data editing unit 208 adds the information 1403 to the Print-Job operation.

In step S1106, the print data editing unit 208 adds 1 to N. The processing returns to step S1103. The print data editing unit 208 repeats the processing of steps S1103 to S1106 while there is function N.

The above is the procedure for the print data editing processing of the print data editing unit 208. By using this procedure, if a function expanded by the print function expansion unit 207 (expansion function) is designated by the user on the print setting screen, the print data can be edited based on the designation. A proper instruction to perform the expansion function can thus be given to the printing apparatus 102. In the case of the present exemplary embodiment, an instruction about the borderless protruding amount function is issued to the printing apparatus 102. If the printing apparatus 102 supports the attribute cij-print-borderless-expandlevel, the print data editing unit 208 adds the attribute information to the print data. If the printing apparatus 102 supports the attribute print-borderless-expandlevel, the print data editing unit 208 adds the attribute information to the print data. If the function is added by the OS or the print data generation software 202, the print data generation software 202 adds the attribute information to the print data. The print data editing unit 208 thus will not add the attribute information redundantly.

As described above, the expansion application 204 according to the present exemplary embodiment can configure the functions supported by the printing apparatus 102 so that the function can be designated by the user. In the present exemplary embodiment, the expansion application 204 expands the functions based on the attribute information included in the attribute data obtained from the printing apparatus 102. If the connected printing apparatus 102 supports a specific function, designation of the function is thereby enabled. If the connected printing apparatus 102 does not support a specific function, the function will not be added. Even in a case where different printer attributes are returned for the same function depending on the type of printing apparatus 102 connected, the same control item is displayed on the print setting screen. The user can thus designate such attributes as the same function on the print setting screen. While the present exemplary embodiment has been described by using the expansion of the borderless protruding amount function as an example, the present exemplary embodiment is also applicable to other functions. If a plurality of functions has been added to the expansion function list 501, the expansion application 204 can add the plurality of functions.

Second Embodiment

A second exemplary embodiment will now be described. The present exemplary embodiment describes a configuration for adding only a setting value or values of a function if the function for the expansion application 204 to add has already been supported by the print data generation software 202. Components and processes not mentioned below are similar to those of the first exemplary embodiment. A description thereof will thus be omitted.

FIG. 12 is a flowchart illustrating a main processing procedure in print function information editing processing of a print function expansion unit 207 according to the present printing system. In the following description, the print function expansion unit 207 may be described as the agent of the processes, whereas the corresponding functions are implemented by a CPU 111 executing the respective corresponding programs.

The processing of steps S1201 to S1212 illustrated in FIG. 12 is similar to the processing of steps S301 to S312 in FIG. 3 and thus a description thereof is omitted, except in the following points. A first difference is that in the present exemplary embodiment, the print function expansion unit 207 proceeds, after the processing of step S1205, not to step S1212 but to step S1206. Specifically, the print function expansion unit 207 continues the expansion processing of step S1206 and the subsequent steps even if the function to be expanded has already been supported by the print data generation software 202 (i.e., even if the function is a standard attribute defined in the IPP specification). A second difference is that the update processing of steps S1207 and 1208 and that of steps S1210 and S1211 are different from those illustrated in FIG. 3. A description will be given below by using the update processing of steps S1210 and S1211 as an example.

FIG. 13A illustrates an example of a PDC before edited by the print function expansion unit 207 according to the present exemplary embodiment. A PDC 1301 includes a feature 1302 PageBorderlessExLevel representing a borderless protruding amount function. That the feature 1302 represents the borderless protruding amount function has been determined by the determination processing of step S1204 based on an expansion function list 501. In the PDC 1301, the feature 1302 supports two options Level_0 and Level_1. Suppose that, like the first exemplary embodiment, a Get-Printer-Attributes response (attribute data obtained from a printing apparatus 102) in step S1201 has the same contents as those of the response 401 illustrated in FIG. 4A. The printer attribute representing the borderless protruding amount function included in the response 401, cij-print-borderless-expandlevel (information 404), supports three setting values level0, level1, and level2. In other words, although the connected printing apparatus 102 has three setting values of the borderless protruding amount function that can be designated, print data generation software 202 has only two setting values that can be designated.

FIG. 8B illustrates an added function list 806, which is an example of the added function list updated by the print function expansion unit 207 in the processing of step S1210. In the processing of step S1210, the print function expansion unit 207 compares the options of function N supported by the PDC 1301 with the setting values of function N included in the response 401, and determines whether there is a setting value included only in the response 401. The print function expansion unit 207 sets the setting values of the printer attribute corresponding to the options already existing in the PDC 1301 to "none" on the added function list 806. As for the setting value that does not exist in the PDC 1301 and is included in the response 401, the print function expansion unit 207 stores the setting value as a new setting value (information 807), and determines and stores a corresponding option name. As for the feature name of function N, the print function expansion unit 207 stores the feature name of function N supported by the PDC 1301.

In step S1211, the print function expansion unit 207 updates the PDC 1301. FIG. 13B illustrates a PDC 1303, which is an example of the updated PDC 1301. The print function expansion unit 207 adds an option 1306 Level_2 to a feature 1305 PageBorderlessExLevel already existing as function N. The print function expansion unit 207 may also add a namespace 1304 as the namespace of the option 1306.

As described above, if a specific function has already been supported by the print data generation software 202, the print function expansion unit 207 according to the present exemplary embodiment can expand only a lacking setting value or values of the function. If function N is not included in the PDC, then in the processing of steps S1210 and S1211, the print function expansion unit 207 expands the function as in the processing of steps S310 and S311. The processing of steps S1207 and S1208 is performed in a similar manner to that of steps S1210 and S1211 based on information about a public printer attribute.

Like the first exemplary embodiment, a print data editing unit 208 according to the present exemplary embodiment performs the print data editing processing illustrated in FIG. 11. Suppose, for example, that function N is PageBorderlessExLevel and the option of PageBorderlessExLevel in the PT is Level_1. On the added function list 806 according to the present exemplary embodiment, the setting value of the printer attribute corresponding to Level_1 is "none". In such a case, the print data editing unit 208 determines that the setting value corresponding to the option has already been added by the print data generation software 202, and does not add a setting value in step S1105. In contrast, suppose that the option of PageBorderlessExLevel in the PT is Level_2. On the added function list 806, the setting value of the printer attribute corresponding to Level_2 is level2. In such a case, the print data editing unit 208 determines that no setting value corresponding to the option is added by the print data generation software 202, and adds level2 to the print data as the setting value of function N.

The expansion application 204 according to the present exemplary embodiment can expand the setting values of functions already supported by the print data generation software 202. For example, the present exemplary embodiment is applicable to a case where a standard function according to the IPP specification, such as designation of a sheet type during printing, has different setting values depending on the configuration of the printing apparatus 102. In other words, the expansion application 204 can maintain the functions already supported by the print data generation software 202 intact and add only setting values. The setting value is added based on the attribute information about the attribute data obtained from the printing apparatus 102. Designation of a specific setting value is therefore enabled if the connected printing apparatus 102 supports the specific setting value. If the connected printing apparatus 102 does not support a specific setting value, the setting value will not be added. Take the borderless protruding amount function described in the present exemplary embodiment as an example. If a connected device A can designate the protruding amount in three levels, three levels of designation are made possible. If a connected device B can designate the protruding amount in five levels, five levels of designation are made possible. While the present exemplary embodiment has been described by using the borderless protruding amount function and sheet types as examples, the present exemplary embodiment is also applicable to other print functions supported by the printing apparatus 102. As illustrated in the flowchart, two or more functions can be added, and only setting values can be added to some of the functions.

Third Embodiment

A third exemplary embodiment will now be described. In the present exemplary embodiment, some processes are added to the processing of the first exemplary embodiment, whereby an expansion application 204 can provide functions even in cases where the functions are unable to be expanded in the first exemplary embodiment. Components and processes not mentioned below are similar to those of the first exemplary embodiment.

The print function information editing processing of the print function expansion unit 207 illustrated in FIG. 3 is configured such that if the determination of step S309 is NO, the print function expansion unit 207 performs processing similar to that of steps S310 and S311. FIG. 8C illustrates an added function list 808 generated by the print function expansion unit 207 in such processing. The print function expansion unit 207 stores information 809 ("none") indicating absence of a corresponding printer attribute to the added function and its setting values. In such a case, if the function is selected by the user, the printing apparatus 102 is determined to not support the function.

In the print data editing processing of the print data editing unit 208 illustrated in FIG. 11, if any of the printer attributes of the functions in the added function list includes "none", the print data editing unit 208 converts the format of the print data. Take the IPP Class Driver as an example. With the print data in the IPP format, the satisfaction of the foregoing condition indicates that the printing apparatus 102 is unable to perform the print function designated by the user in the IPP format. In such a case, the print data editing unit 208 converts the print data of the IPP format into print data of different format in which the user-designated print function can be used. For example, a print data format specific to the vendor providing the expansion application 204 can usually use all the functions provided by the printing apparatus 102. The print data editing unit 208 converts the print data of the IPP format into the foregoing print data format specific to the vendor, for example.

Such a configuration can enable designation of functions that are supported by the printing apparatus 102 and unable to be designated in the format of print data generated by the print data generation software 202 by using the expansion application 204. Moreover, the configuration of the present exemplary embodiment may be combined with that of the second exemplary embodiment so that print data is converted into print data in different format if the setting value of the print function designated by the user is not executable in the IPP format. The use of the expansion application 204 can thus enable designation of setting values that are supported by the printing apparatus 102 and unable to be designated in the format of print data generated by the print data generation software 202.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A non-transitory computer-readable storage medium storing an application program configured to support software, the software configured to generate print data from image data having been output by a contents-generation application configured to generate a first setting screen on which a first setting value is able to be set based on first print function information, the print data being printable on printers supplied by multiple venders, the software configured to transmit the print data to a printer among the printers, the application program including instructions causing a computer of an information processing apparatus to execute a method comprising:

obtaining information corresponding to a second setting value available by the printer to which print data is transmitted;

changing the first print function information into second print function information so that the second print function information includes information regarding the second setting value, the second print function information being used to produce capability information; and causing a display of the information processing apparatus to display a second setting screen on which the first setting value and the second setting value are able to be set as setting values for one setting item, the second setting value not able to be set on the first setting screen, the second setting screen being different from the first setting screen and being provided by the application program and displayed by the application program based on the capability information.

2. A non-transitory computer-readable storage medium storing an application program configured to support software, the software configured to generate print data from image data having been output by a contents-generation application configured to generate a first setting screen on which a first feature is displayed based on first print function information, the print data being printable on printers supplied by multiple venders, the software configured to transmit the print data to a printer among the printers, the application program including instructions causing a computer of an information processing apparatus to execute a method comprising:

obtaining information corresponding to a second feature available by the printer to which print data is transmitted;

changing the first print function information into second print function information so that the second print function information includes information regarding the second feature, the second print function information being used to produce capability information; and causing a display of the information processing apparatus to display a second setting screen on which the first feature and the second feature are displayed, the second feature not able to be displayed on the first setting screen, the second setting screen being different from the first setting screen and being provided by the application program and displayed by the application program based on the capability information.

3. The non-transitory computer-readable storage medium according to claim 1, the setting item corresponding to a feature, the feature including at least one of a feature for medium size, a feature for borderless setting, and a feature for finishing.

4. The non-transitory computer-readable storage medium according to claim 1, the second setting value being obtained from the printer by issuing Get-Printer-Attributes operation.

5. The non-transitory computer-readable storage medium according to claim 2, the second feature being obtained from the printer by issuing Get-Printer-Attributes operation.

6. The non-transitory computer-readable storage medium according to claim 1, the method further comprising obtaining the first setting value.

7. The non-transitory computer-readable storage medium according to claim 2, the method further comprising obtaining the first feature.

8. The non-transitory computer-readable storage medium according to claim 1, wherein the print function information is Print Device Capabilities (PDC), and wherein the capability information is PrintCapabilities (PC).

9. The non-transitory computer-readable storage medium according to claim 2, wherein the print function information is Print Device Capabilities (PDC), and wherein the capability information is PrintCapabilities (PC).

10. The non-transitory computer-readable storage medium according to claim 1, the software being an Internet Printing Protocol (IPP) Class Driver, and the print data being data in format according to IPP.

11. The non-transitory computer-readable storage medium according to claim 1, wherein the information corresponding to the second setting value is the second setting value.

12. The non-transitory computer-readable storage medium according to claim 2, wherein the information corresponding to the second feature is the second feature.

13. A control method of an information processing apparatus on which an application program runs, the application program being configured to support software, the software configured to generate print data from image data having been output by a contents-generation application configured to generate a first setting screen on which a first setting value is able to be set based on first print function information, the print data being printable on printers supplied by multiple venders, the software configured to transmit the print data to a printer among the printers, the information processing apparatus configured to communicate with the printers, the control method comprising:

obtaining information corresponding to a second setting value available by the printer to which print data is transmitted;

changing the first print function information into second print function information so that the second print function information includes information regarding the second setting value, the second print function information being used to produce capability information; and causing a display of the information processing apparatus to display a second setting screen on which the first setting value and the second setting value are able to be set as setting values for one setting item, the second setting value not able to be set on the first setting screen, the second setting screen being different from the first setting screen and being provided by the application program and displayed by the application program based on the capability information.

14. A control method of an information processing apparatus on which an application program runs, the application program being configured to support software, the software configured to generate print data from image data having been output by a contents-generation application configured to generate a first setting screen on which a first feature is displayed based on first print function information, the print data being printable on printers supplied by multiple venders, the software configured to transmit the print data to a printer among the printers, the information processing apparatus configured to communicate with the printers, the control method comprising:

obtaining information corresponding to a second feature available by the printer to which print data is transmitted;

changing the first print function information into second print function information so that the second print function information includes information regarding the second feature, the second print function information being used to produce capability information; and causing a display of the information processing apparatus to display a second setting screen on which the first feature and the second feature are displayed, the second feature not able to be displayed on the first setting screen, the second setting screen being different from the first setting screen and being provided by the application program and displayed by the application program based on the capability information.

15. The control method according to claim 13, the setting item corresponding to a feature, the feature including at least one of a feature for medium size, a feature for borderless setting, and a feature for finishing.

16. The control method according to claim 13, the first second setting value being obtained from the printer by issuing Get-Printer-Attributes operation.

17. The control method according to claim 14, the first second feature being obtained from the printer by issuing Get-Printer-Attributes operation.

18. The control method according to claim 13, further comprising obtaining the first setting value.

19. The control method according to claim 14, further comprising obtaining the first feature.

20. The control method according to claim 13, wherein the print function information is Print Device Capabilities (PDC), and wherein the capability information is PrintCapabilities (PC).

21. The control method according to claim 14, wherein the print function information is Print Device Capabilities (PDC), and
wherein the capability information is PrintCapabilities (PC).

22. The control method according to claim 13, the software being an Internet Printing Protocol (IPP) Class Driver, and the print data is data in format according to IPP.

23. The control method according to claim 13, wherein the information corresponding to the second setting value is the first setting value.

24. The control method according to claim 14, wherein the information corresponding to the second feature is the first feature.

25. An information processing apparatus comprising:
a display;
one or more processors; and
at least one memory storing an application program configured to support software, the software configured to generate print data from image data having been output by a contents-generation application configured to generate a first setting screen on which a first setting value is able to be set based on first print function information, the print data being printable on printers supplied by multiple venders, the software configured to transmit the print data to a printer among the printers, the application program including instructions, which when executed by the one or more processors, cause the information processing apparatus to:
obtain information corresponding to a second setting value available by the printer to which print data is transmitted;
change the first print function information into second print function information so that the second print function information includes information regarding the second setting value, the second print function information being used to produce capability information; and
cause the display to display a second setting screen on which the first setting value and the second setting value are able to be set as setting values for one setting item, the second setting value not able to be set on the first setting screen, the second setting screen being different from the first setting screen and being provided by the application program and displayed by the application program based on the capability information.

26. An information processing apparatus comprising:
a display;
one or more processors; and
at least one memory storing an application program configured to support software, the software configured to generate print data from image data having been output by a contents-generation application configured to generate a first setting screen on which a first feature is displayed based on first print function information, the print data being printable on printers supplied by multiple venders, the software configured to transmit the print data to a printer among the printers, the application program including instructions, which when executed by the one or more processors, cause the information processing apparatus to:
obtain information corresponding to a second feature available by the printer to which print data is transmitted;
change the first print function information into second print function information so that the second print function information includes information regarding the second feature, the second print function information being used to produce capability information; and
cause the display to display a second setting screen on which the first feature and the second feature are displayed, the second feature not able to be displayed on the first setting screen, the second setting screen being different from the first setting screen and being provided by the application program and displayed by the application program based on the capability information.

27. The non-transitory computer-readable storage medium according to claim 1, the second setting value being obtained from the printer by issuing an operation complying with Internet Printing Protocol (IPP).

28. The non-transitory computer-readable storage medium according to claim 2, the second feature being obtained from the printer by issuing an operation complying with Internet Printing Protocol (IPP).

29. The non-transitory computer-readable storage medium according to claim 1, wherein the changing of the first print function information into the second print function information is performed when an option device is added to the printer.

30. The non-transitory computer-readable storage medium according to claim 2, wherein the changing of the first print function information into the second print function information is performed when an option device is added to the printer.

31. The control method according to claim 13, the second setting value being obtained from the printer by issuing an operation complying with Internet Printing Protocol (IPP).

32. The control method according to claim 14, the second feature being obtained from the printer by issuing an operation complying with Internet Printing Protocol (IPP).

33. The control method according to claim 13, wherein the changing of the first print function information into the second print function information is performed when an option device is added to the printer.

34. The control method according to claim 14, wherein the changing of the first print function information into the second print function information is performed when an option device is added to the printer.

35. The non-transitory computer-readable storage medium according to claim 1, wherein the software is provided by a provider of an operating system of the information processing apparatus, and wherein the application program is provided by a manufacturer of the printer.

36. The non-transitory computer-readable storage medium according to claim 2, wherein the software is provided by a provider of an operating system of the information processing apparatus, and wherein the application program is provided by a manufacturer of the printer.

37. The control method according to claim 13, wherein the software is provided by a provider of an operating system of the information processing apparatus, and wherein the application program is provided by a manufacturer of the printer.

38. The control method according to claim 14, wherein the software is provided by a provider of an operating system of the information processing apparatus, and wherein the application program is provided by a manufacturer of the printer.

39. The non-transitory computer-readable storage medium according to claim 1, wherein the image data is drawing data.

40. The non-transitory computer-readable storage medium according to claim 2, wherein the image data is drawing data.

41. The control method according to claim 13, wherein the image data is drawing data.

42. The control method according to claim 14, wherein the image data is drawing data.

43. The non-transitory computer-readable storage medium according to claim 2, wherein the information corresponding to the second feature includes a name of a function of the printer, and wherein the information processing apparatus stores information that complies with Internet Printing Protocol (IPP) and represents the function.

44. The control method according to claim 14, wherein the information corresponding to the second feature includes a name of a function of the printer, and wherein the information processing apparatus stores information that complies with Internet Printing Protocol (IPP) and represents the function.

\* \* \* \* \*